(12) United States Patent
Nolte

(10) Patent No.: US 11,712,953 B2
(45) Date of Patent: Aug. 1, 2023

(54) MOTOR VEHICLE SIDE DOOR AND METHOD FOR MOUNTING THE SAME

(71) Applicant: Hutchinson GmbH, Mannheim (DE)

(72) Inventor: Georg Nolte, Mannheim (DE)

(73) Assignee: Hutchinson GmbH, Mannheim (DE)

( * ) Notice: Subject to any disclaimer, the term of this patent is extended or adjusted under 35 U.S.C. 154(b) by 41 days.

(21) Appl. No.: 17/313,264

(22) Filed: May 6, 2021

(65) Prior Publication Data

US 2021/0347239 A1 Nov. 11, 2021

(30) Foreign Application Priority Data

May 7, 2020 (EP) ..................................... 20305458

(51) Int. Cl.
*B60J 10/76* (2016.01)
*B60J 10/27* (2016.01)
*B60J 5/04* (2006.01)

(52) U.S. Cl.
CPC ............. *B60J 10/76* (2016.02); *B60J 5/0402* (2013.01); *B60J 10/27* (2016.02)

(58) Field of Classification Search
CPC ......... B60J 10/76; B60J 10/763; B60J 10/767
See application file for complete search history.

(56) References Cited

U.S. PATENT DOCUMENTS 10,427,511 B2 * 10/2019 Blottiau .................... B60J 10/74
11,338,651 B2 * 5/2022 Baratin ....................... B60J 1/17

2006/0037249 A1* 2/2006 Kawamura ............... B60J 10/74
                                                                    49/428
2016/0129767 A1* 5/2016 Nojiri ....................... B60J 10/76
                                                                    49/459
2018/0141421 A1* 5/2018 Blottiau .................... B60J 10/17
2018/0313139 A1* 11/2018 Nishikawa ............... B60J 10/79
2020/0215881 A1* 7/2020 Baratin ....................... B60J 1/17
2020/0338966 A1* 10/2020 Veille ......................... B60J 1/17
2021/0347239 A1* 11/2021 Nolte ....................... B60J 10/76

(Continued)

FOREIGN PATENT DOCUMENTS

EP          3102448 B1    1/2019
EP          3558728 A1   10/2019

(Continued)

OTHER PUBLICATIONS

Extended European Search Report dated Oct. 27, 2020, issued in priority European Application No. 20305458.0, filed May 7, 2020, 5 pages.

*Primary Examiner* — Marcus Menezes
(74) *Attorney, Agent, or Firm* — Christensen O'Connor Johnson Kindness PLLC

(57) ABSTRACT

A motor vehicle side door includes a glass panel, a frame, and an elastomer run seal. The elastomer run seal includes at least one protruding rib that is located and dimensioned so as to be able to come into abutment against a free end of an inner wall of the frame when the at least one ascending strand is in a preliminary mounting position on the frame, and to be able to come into abutment against an inner wall of the frame when the at least one ascending strand is in a final mounting position on the frame, a gap between both inner and outer walls having a size which is higher when the run seal is in the preliminary mounting position than when it is in the final mounting position.

15 Claims, 6 Drawing Sheets

(56) References Cited

U.S. PATENT DOCUMENTS

2022/0118829 A1* 4/2022 Galluccio .................. B60J 1/17
2022/0161639 A1* 5/2022 Nolte ..................... B60J 5/0468

FOREIGN PATENT DOCUMENTS

| FR | 3089459 A1 | * | 6/2020 | ................ B60J 1/17 |
| GB | 2557664 A | * | 6/2018 | ................ B60J 1/17 |
| WO | 2018/109061 A1 | | 6/2018 | |

* cited by examiner

-- Prior ART--

-- Prior ART--

MOTOR VEHICLE SIDE DOOR AND METHOD FOR MOUNTING THE SAME

TECHNICAL FIELD

Embodiments of the present disclosure relate at least to a motor vehicle side door and a method for mounting the same.

BACKGROUND

A vehicle side door includes a moveable glass panel that may slide and be moved from an upright position to a downright position and from the downright position to the upright position. The door comprises a lower body and an upper frame. In its downright position, the glass panel is located at least in part inside the door body and, in its upright position, the glass panel is surrounded by the frame which extends along the peripheral edges of the glass panel.

Sealing between the glass panel and the door frame is ensured by an elastomer run seal called glass run channel (GRC) which is secured onto the frame and extends along this frame. The run seal defines a channel in which the glass panel is able to slide when moving. The run seal may further include sealing lips abutting against outer and inner faces of the glass panel. Typically, the run seal is U-shaped and comprises two vertical or ascending strands which are connected therebetween at their upper ends by means of a horizontal or top strand. The strands of the run seal are each produced by extrusion and are then bonded to each other by overmolding bonding corners between the upper ends of the ascending strands and the longitudinal ends of the horizontal strand.

The exterior appearance of a vehicle door is very important for the customer, i.e., the user of the vehicle. A solution for enhancing the appearance of a vehicle door is to lying flush the outside of its glass panel with the outside of the structure surrounding this panel. One of the vertical edge elements of the frame may for instance be adjacent to the glass panel and have an outer face laterally flush with the outer face of the glass panel.

FIGS. 1 to 3 illustrate the prior art and show elements similar to the ones disclosed in documents EP-B1-3 102 448 and EP-A1-3 558 728, the disclosures of which are incorporated by reference in their entirety.

FIGS. 1 and 2 show an elastomer run seal 10 and a glass panel 12 of a motor vehicle side door. FIG. 3 is a cross sectional view of the side door 16 and further shows the frame 18 extending along the edges of the glass panel 12.

The run seal 10 is U-shaped and comprises two ascendant strands 10b which are connected therebetween at their upper ends by means of a top strands 10a.

One or each ascending strand 10b has a transversal section substantially in the shape of a U that comprises an inner branch 20 and an outer branch 22 connected together by a connecting branch 24, and which cooperates with the glass panel 12.

The glass panel 12 has an outer face 12b and an inner face 12a and carries a panel guide 14 secured onto the inner face 12a. The outer face 12b laterally flush with an outer face 26a of a vertical edge element 26 of the frame 18.

The vertical edge element 26 comprises a U-shaped portion in cross section including an outer wall 28 which is parallel to the glass panel 12 and which includes the outer face 26a, an inner wall 30 which is parallel to the glass panel 12, and a connecting wall 32 connecting the outer wall 28 to the inner wall 30, As shown in FIG. 3, the outer branch 22 of the run seal 10 is configured to be in contact with the outer wall 28 and to be sealably in contact with the glass panel 12. The inner branch 20 is able to be in contact with the inner wall 30, and the inner and outer branches 20, 22 define therebetween a gap 34 which extends in a plane P substantially perpendicular to the glass panel 12.

This gap 34 is crossed by the panel guide 14, and the outer branch 22 comprises a groove 36 that is able to receive at least one hook 14a of the panel guide 14. As shown in FIG. 3, the gap 34 is large and much higher than the thickness E of the panel guide 14 and even than the thickness E' of the hook 14a.

The inner branch 20 comprises protruding ribs 38 which are able to be in contact with the inner wall 30 so as to position the run seal 10 relative to the vertical edge element 26.

The run seal 10 of FIGS. 1 to 3 is mounted by a method comprising a first step of engaging the ascendant strand 10b of the run seal 10 into the vertical edge element 26 so that the outer branch 22 of the run seal 10 comes in contact with the outer wall 28, and the inner branch 20 comes in contact with the inner wall 30. Then, the connecting branch 24 extends in front of the connecting wall 32 and is parallel to this connecting wall.

The method then includes a second step in which the glass panel 12 carrying the panel guide 14 is mounted. The glass panel 12 is aligned with the outer wall 28 of the vertical edge element 26 and is displaced towards this outer wall (arrow F) so that the panel guide 12 crosses the gap 34 and the hook 12a is engaged in the groove 36 of the outer branch 22.

However, due to the size of the gap 34, the glass panel 10 may move or vibrate in the plane P. The panel guide 14 is in abutment against the outer branch 22 but has to move a large distance D (equal to the difference between the size of the gap 34 and the thickness E of the panel guide 14) before coming in abutment against the inner branch 20.

Moreover, since the thickness E' is lower than the gap 34, the hook 14a may cross back through the gap 34 and may exit from the groove 36 of the outer branch 22 which may lead in problem of security for instance when an unauthorized person wishes to enter into the vehicle by forcing the door or the glass panel to open.

The disclosure proposes a simple, effective and economical solution to these problems.

SUMMARY

According to the disclosure there is provided a motor vehicle side door. In an embodiment, the motor vehicle side door comprises:

a glass panel having an outer face and an inner face and carrying a panel guide secured onto the inner face, the glass panel being able to be moved from an upright position to a downright position, and a frame that is configured to extend along edges of the glass panel when the glass panel is in the upright position, the frame including a vertical edge element which is adjacent to the glass panel when it is in the upright position and which has an outer surface laterally flush with the outer face.

In an embodiment, the vertical edge element comprising a U-shaped portion in cross section including an outer wall which is parallel to the glass panel and which includes the outer surface, an inner wall which is parallel to the glass panel, and a connecting wall connecting the outer wall to the inner wall.

The motor vehicle side door also comprise in some embodiments an elastomer run seal mounted on the frame and suitable for receiving the glass panel when moving. The run seal comprises at least one ascending strand configured to be mounted at least in part in the U-shaped portion. The at least one ascending strand has an outer branch configured to be in contact with the outer wall and to be sealably in contact with the glass panel, an inner branch able to be in contact with the inner wall, and a connecting branch connecting the outer branch to the inner branch, an outer face of the inner branch and an inner face of the outer branch defining therebetween a gap which extends in a first plane substantially perpendicular to the glass panel and which is configured to be crossed by the panel guide. The outer branch comprises a groove that is able to receive at least one hook of the panel guide, and the inner branch comprises an inner face comprising at least one protruding rib which is able to be in contact with an outer face of the inner wall or against an outer face of the frame.

In some embodiments, the motor vehicle side door further comprises at least one protruding rib located and dimensioned so as to be able to come into abutment against a free end of the inner wall or of the frame when the at least one ascending strand is in a preliminary mounting position on the frame, and to be able to come into abutment against the outer face of the inner wall or against the outer face of the frame when the at least one ascending strand is in a final mounting position on the frame, moving of the at least one ascending strand from the preliminary mounting position to the final mounting position being realized in a direction substantially perpendicular to the first plane.

In some embodiments, the gap has a size measured in the first plane which is higher when the run seal is in the preliminary mounting position than when it is in the final mounting position.

The disclosure proposes therefore example embodiments to optimize the size of the above mentioned gap so as to avoid the drawbacks of the prior art. To this aim or others, the gap is intended to have a first size in a preliminary mounting position of the ascendant strand relative to the frame or its vertical edge element, and to have a lower second size in a final mounting position of the run seal. Reducing the size of the gap is rendered possible, for example, by the dimensions and location of the protruding rib(s) of the inner branch of the run seal that is or are intended to come into abutment with the inner wall of the vertical edge element or with the frame. When the ascendant strand is moved from the preliminary mounting position to the final mounting position, the protruding rib(s) are moved from a position where it/they is/are in contact with the free end of the inner wall or of the frame up to a position where it/they come(s) into abutment against the outer face of the inner wall or the frame. This displacement leads to the lift and displacement of the inner branch towards the outer branch and therefore of a reduction of the gap.

As will be described hereunder, the displacement of the ascendant strand is advantageously performed by, for example, the panel guide so that this panel guide may be trapped between the outer and inner branches when the gap is reduced.

Embodiments of the motor vehicle side door may also comprise one or more of the following features, taken alone from each other or in combination with each other:

the at least one protruding rib has a triangular or trapezoidal shape in cross section;

the inner branch has a first end connected to the connecting wall and an opposite second end;

the at least one protruding rib is located at a distance D1 from the first end which is lower than a distance D2 between the protruding rib and the opposite second end;

the at least one protruding rib is located at the opposite second end;

a first protruding rib is located at the opposite second end and a second protruding rib is located at a distance D2 from the opposite second end and at a distance D1 from the first end;

the first protruding rib has a thickness higher than a thickness of the second protruding rib, the thicknesses being measured in directions perpendicular to the glass panel;

the protruding rib has a thickness which is equal to the gap size or which is higher than the gap size, when the run seal is in the final mounting position, the thicknesses being measured in directions perpendicular to the glass panel;

the protruding rib comprises a first surface located on a glass panel side and a second surface located on an opposite side, the first surface being substantially perpendicular to the inner branch and the second surface being inclined so as to form a ramp configured to cooperate by sliding with the free end;

the inner wall includes a retaining rib extending towards the glass panel and configured to come into abutment with the at least one protruding rib so as to retain the run seal in the final mounting position;

the retaining rib has a triangular or trapezoidal shape in cross section;

the retaining rib comprises a first surface located on a glass panel side and a second surface located on an opposite side, the second surface being substantially perpendicular to the inner wall and the first surface being inclined so as to form a ramp configured to cooperate by sliding with the at least one protruding rib;

the inner wall comprises a first end connected to the connecting wall and an opposite second end, the retaining rib being located on the opposite second end;

the inner wall has a length measured between both first and opposite second ends which is higher than a length of the outer wall;

the inner and connecting branches are connected therebetween by a longitudinal portion of the run seal, the longitudinal portion being made of a first material which is different from a second material of the inner and connecting branches and which has a Shore A hardness lower than that of the second material;

the first material has a Shore A hardness of lower than 75 while the second material has a Shore A hardness of higher than 75;

the outer wall includes a protruding leg which protrudes from the inner face of the outer wall towards the outer face of the inner wall and which is configured to be engaged into a groove of the outer branch;

the protruding leg has a triangular, rectangular or trapezoidal shape in cross section;

the outer wall comprises a first end or portion connected to the connecting wall and an opposite second end, the protruding leg being located on or close to the opposite second end;

the vertical edge element is secured to the frame by snap fitting or by screwing;

the panel guide comprises a first edge secured onto the inner face of the glass panel and an opposite second edge which is L-shaped and which includes a first portion parallel to the glass panel and having a thickness lower than the gap size when the run seal is in both preliminary and final mounting positions, and a second portion perpendicular to the glass panel and forming the at least one hook, the hook having a thickness higher than the gap size when the run seal is in the preliminary mounting position, the thicknesses being measured in directions perpendicular to the glass panel.

The disclosure further proposes embodiments of a method for mounting the motor vehicle door. In an embodiment, the method comprises the steps of:

positioning the run seal so that its ascending strand is in the preliminary mounting position relative to the inner wall or the frame, wherein the connecting branch is engaged in the U-shaped portion and the at least one protruding rib is in abutment against the free end of the inner wall or of the frame, and engaging the panel guide through the gap and into the U-shaped so as to push the ascending strand in the final mounting position, wherein the connecting branch is moved towards the connecting wall and the at least one protruding rib is forced to come into abutment against the outer face of the inner wall or of the frame.

In some embodiments, the method may also comprise one or more of the following features and/or steps, taken alone from each other or in combination with each other:

step a) is performed by displacing the ascending strand in at least one direction which is substantially parallel to the inner and outer walls or which is inclined by an angle of 1 to 30° relative to the inner and outer walls;

step b) is performed by displacing the glass panel in a direction which is substantially parallel to the inner and outer walls;

before step a), the ascending strand has a rest position in which the inner and connecting branches are inclined one another by an angle higher than 90°;

after step b), the ascending strand has a constrained position in which the inner and connecting branches are inclined one another by an angle lower than 90°.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the present specification, the words "inner", "inside", "interior", etc., make reference to the inside of a motor vehicle. The words "outer" "outside", "exterior", etc., make reference to the outside of the motor vehicle. Then, an outer element is located at the outer side of the vehicle. A first outer element, portion or surface may be visible by a user of the motor vehicle or may be hidden by a second outer element, portion or surface covering said first outer element.

Moreover, the axes X, Y and Z make respectively reference to three perpendicular axes. Axis X extends along a longitudinal direction of the vehicle which is substantially horizontal, and in particular from the rear to the front of the vehicle. Axis Y extends transversely to the car, from a side to the opposite side. Considering a side door, axis Y extends from the interior to the exterior of this side door. Axis Z extends substantially vertically from downward to upward.

Furthermore, a length is considered to be measured in a direction parallel to axis X. A thickness is considered to be measured in a direction parallel to axis Y and a height is considered to be measured in a direction parallel to axis Z.

Figure 1:
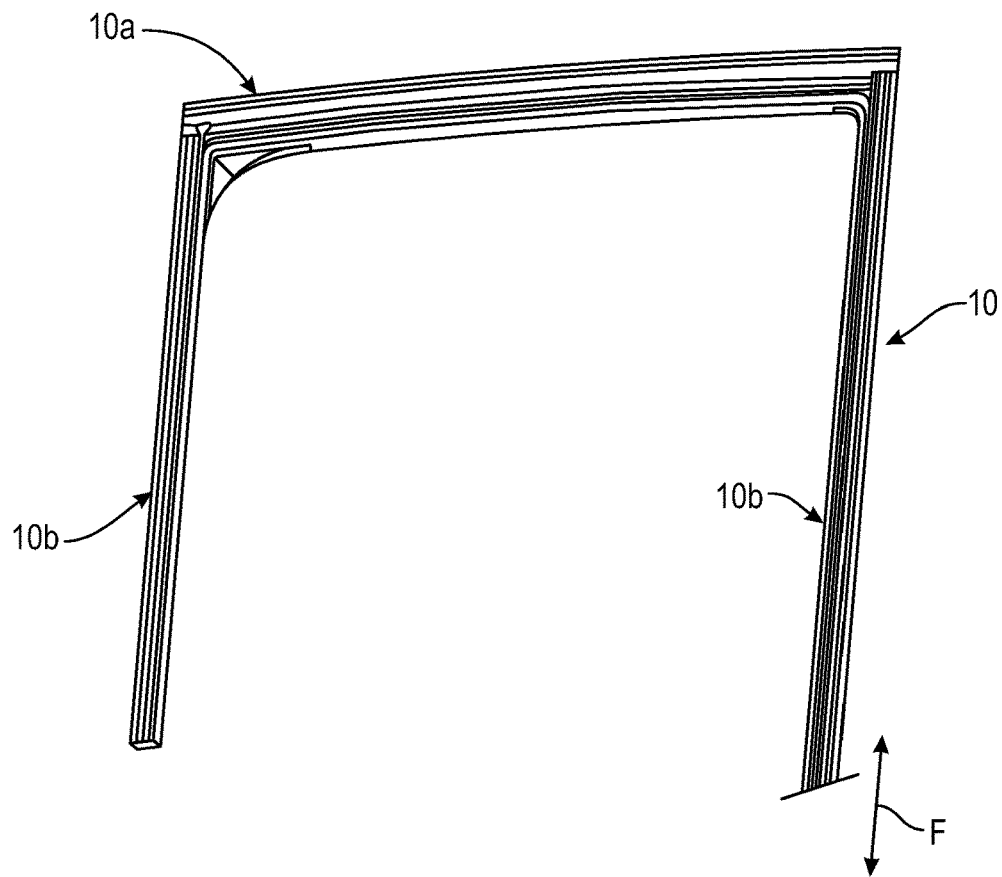
FIG. 1 is a schematic perspective view of an elastomer run seal and of a glass panel for a motor vehicle side door, the glass panel being remote from the run seal and being located into a body of the door.
Figure 1:
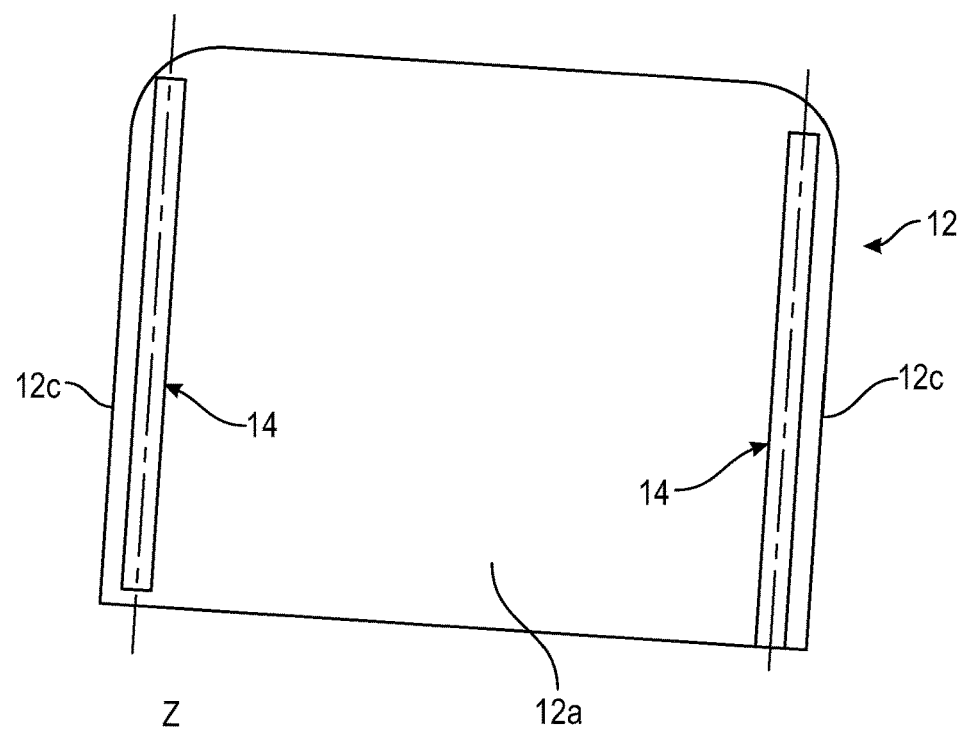
Figure 2:
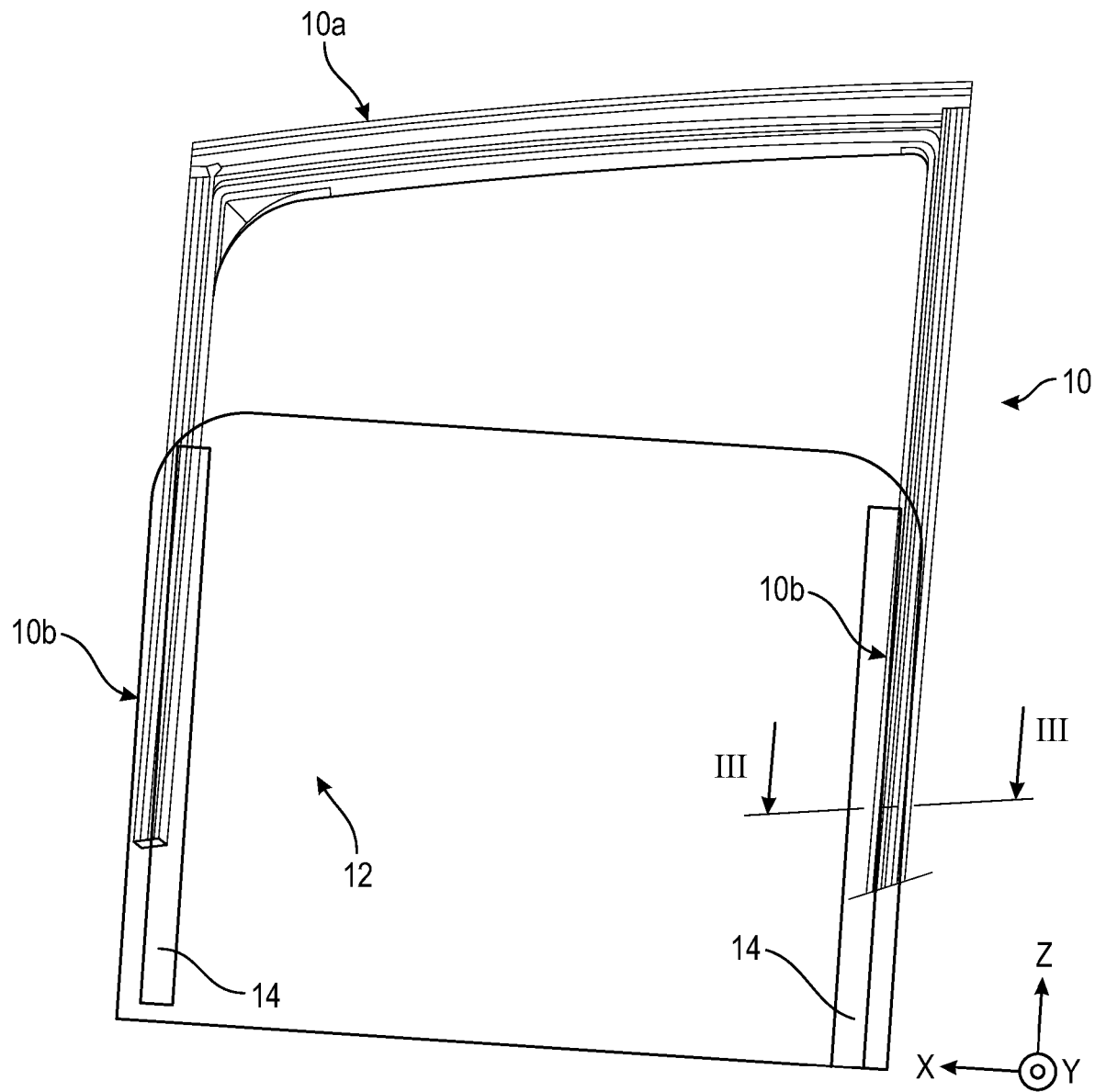
FIG. 2 is another schematic perspective view of the elastomer run seal and the glass panel of FIG. 1, the glass panel being partially engaged and guided into the run seal.
Figure 3:
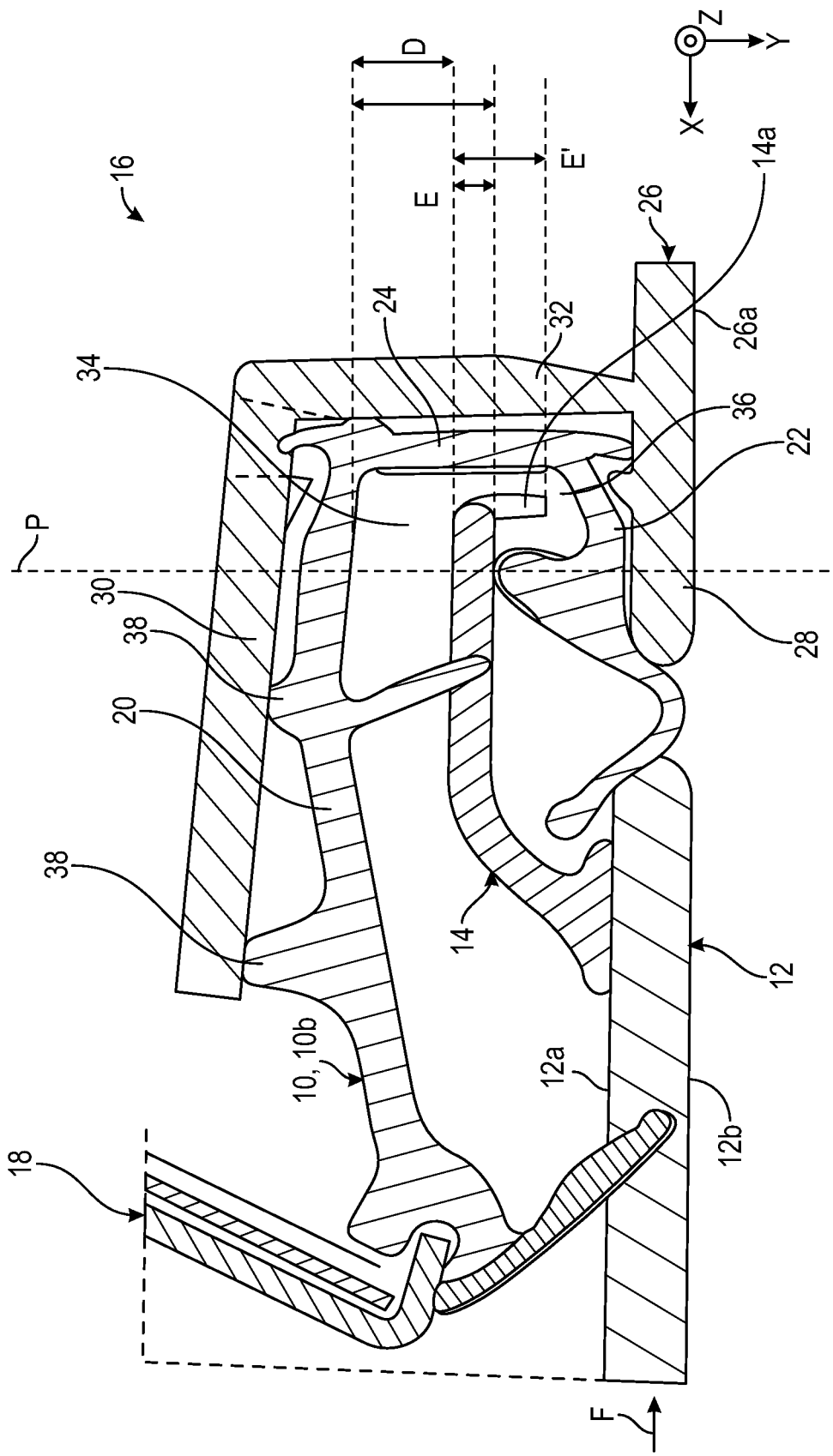
FIG. 3 is a schematic cross-section view of the motor vehicle side door of FIG. 2 and further shows the frame of the door, the cross-section being taken according to the line III-III of FIG. 2.

FIGS. 1 to 3 illustrate the prior art and have been described above but can also be used to illustrate some features of the motor vehicle side door 16 according to the disclosure. As specified above, a motor vehicle side door 16 includes at least: a glass panel 12 carrying at least one panel guide 14; a frame 18 including at least one vertical edge element 26; and a run seal 10 ensuring the sealing and the guiding of the glass panel 12 relative to the frame.

Figure 4:
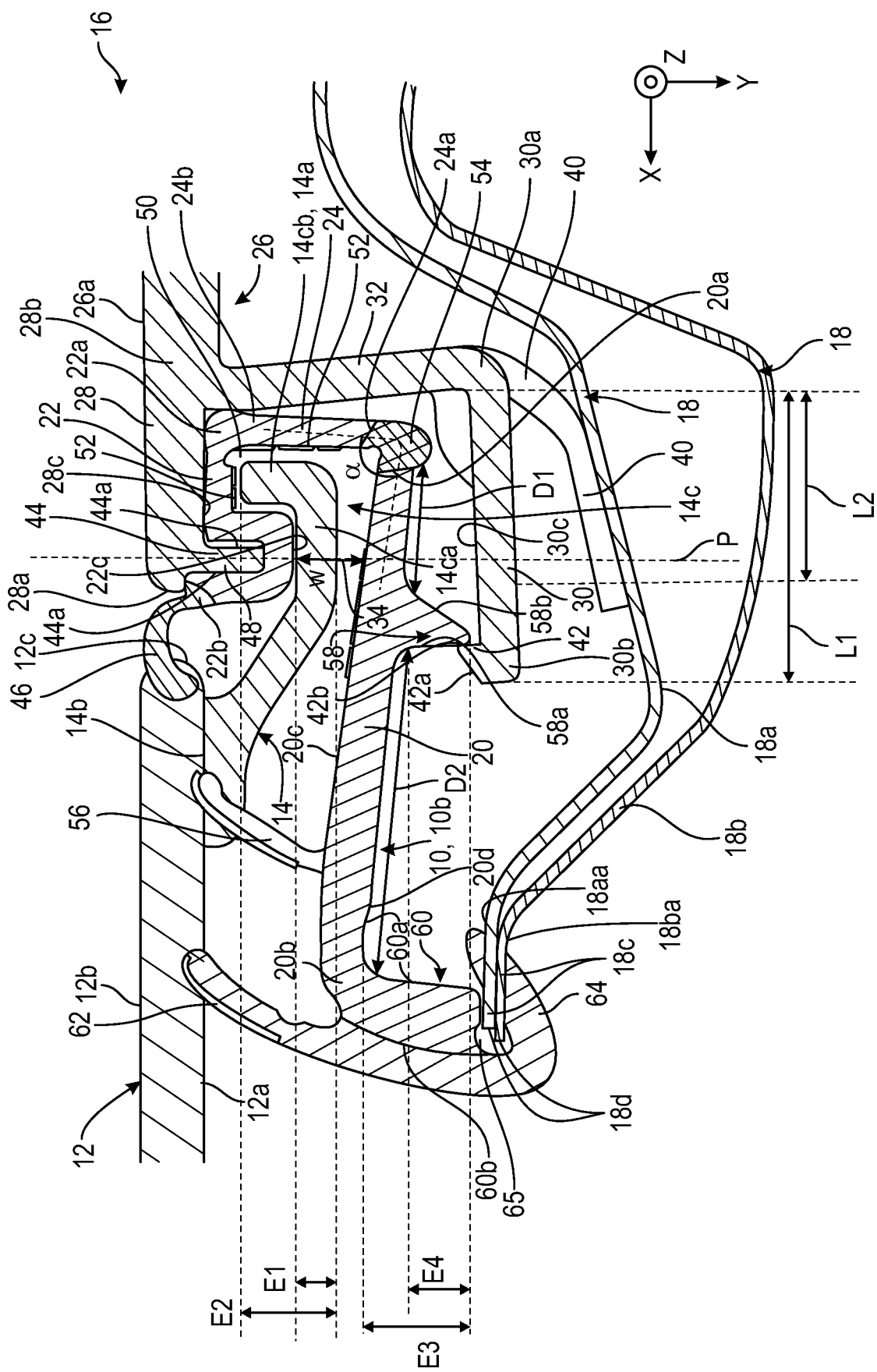
FIG. 4 is a schematic cross-section view similar to the view of FIG. 3 and showing a first embodiment of the motor vehicle side door according to the disclosure.

FIG. 4 illustrates a first embodiment of the disclosure. In FIG. 4 and the following FIGURES still illustrating the disclosure, the elements that have already been described in relation with FIGS. 1 to 3 are designated by the same reference numerals for better clarity and understanding.

The run seal 10 of FIG. 4 is U-shaped as shown in FIGS. 1 and 2 and comprises two ascendant strands 10b which are connected therebetween at their upper ends by a top strand 10a. Only one of the ascendant strands 10b is visible in FIG. 4.

This ascending strand 10b of FIG. 4 has a transversal section substantially in the shape of a U and comprises an inner branch 20 and an outer branch 22 connected together by a connecting branch 24, and which receives the panel guide 14 carried by the glass panel 12. The panel guide 14 is secured onto the inner face 12a of the glass panel 12. The outer face 12b of the glass panel 12 laterally flush with an outer face 26a of the vertical edge element 26 of the frame 18. The vertical edge element 26 comprises a U-shaped portion in cross section including an outer wall 28 which is parallel to said glass panel 12 and which includes the outer face 26a, an inner wall 30 which is parallel to said glass panel 12, and a connecting wall 32 connecting said outer wall 28 to said inner wall 30.

The various elements of the motor vehicle side door 16 will now be described in more detail.

The glass panel 12 includes a vertical edge 12c which is coplanar with said outer wall 28 and which faces a vertical edge 28a of this outer wall. The panel guide 14 is secured onto the inner face 12a along the edge 12c. The panel guide 14 includes a first edge 14b which is applied onto the inner face 12a and secured thereto, for instance by bonding or gluing, and an opposite second edge 14c which is substantially L-shaped. The second edge 14c includes a first portion 14ca parallel to the glass panel 12 and a second portion 14cb perpendicular to the glass panel 12 and forming said hook(s) 14a.

In case where the panel guide 14 would comprise a single hook 14a, this hook may extend along a portion or the totality of the height of the panel guide 14. In case where the panel guide would comprise two or more hooks, these hooks may be located at specific locations along the height of the panel guide. Both edges 14b, 14c are connected therebetween by means of an intermediate portion 14c which is inclined relative to the glass panel 12.

E1 designates the thickness of the panel guide 14, and in particular of its portion 14ca. E2 designates the thickness of the hook(s) 14a. Both thicknesses are measured in directions which are perpendicular to the glass panel 12.

The frame 18 may be made of metal or plastic or both. The frame 18 may for instance comprise at least one metal plate 18a, 18b which is configured to extend along and inwardly from the edge 12c of the glass panel 12, and from the run seal 10. The vertical edge element 26 may be made as a single piece with the frame 18 or may be secured thereto. This vertical edge element 26 is for instance made of a plastic or composite material.

In the example shown in FIG. 4, the inner wall 30 of the vertical edge element 26 comprises at least one fastening leg 40 intended to be secured to the frame 18, for instance by fasteners such as screw(s), bolt(s) or equivalent means. This leg 40 is connected to the inner end of the connecting wall 32 and extends inwardly from the inner wall 30. The leg 40 is spaced from the rest of the inner wall 30 and has a length measured along axis X which is similar than those of the inner wall 30.

Furthermore, in the example shown, the frame 18 includes two metal plates 18a, 18b: an inner metal plate 18a and an outer metal plate 18b. Both plates 18a, 18b are substantially superimposed and extend inwardly from the vertical edge element 26 and the glass panel 12. Both metal plates 18a, 18b include longitudinal portions 18c opposite to the vertical edge element 26 that are substantially parallel to the glass panel 12 ant that include free ends 18d.

The inner wall 30 of the vertical edge element 26 comprises a first end 30a connected to the connecting wall 32 and an opposite second end 30b that is free in the example shown. The inner wall 30 includes a retaining rib 42 extending towards the outer wall 28 or the glass panel 12 from an outer face 30c of the inner wall. The retaining rib 42 has a triangular or trapezoidal shape in cross section. The retaining rib 42 comprises a first surface 42a located on a glass panel side and a second surface 42b located on an opposite side. The second surface 42b is substantially perpendicular to the inner wall 30 and the first surface 42a is inclined so as to form a ramp. The retaining rib 42 is located on said opposite second end 30b.

The connecting wall 32 is substantially perpendicular to the walls 28 and 30. The outer wall 28 of the vertical edge element 26 comprises a portion or an end connected to the connecting wall 32 and the free end 28a. The outer wall 28 includes a protruding leg 44 which protrudes from an inner face 28c of the outer wall towards the outer face 30c of the inner wall 30. In the example shown, the leg 44 has a rectangular shape in cross section and includes two opposite faces 42a which are parallel therebetween and perpendicular to the glass panel 12. The protruding leg 44 is located on or close to said free end 28a.

The run seal 10 and in particular its ascendant strand 10b may be made of one or more material which is, for example, an elastic material such as an elastomer.

The connecting branch 24 is substantially parallel to the connecting wall 32 and perpendicular to the glass panel 12. The connecting branch 24 includes an inner end 24a connected to a first end 20a of the inner branch 20, and an outer end 24b connected to a first end 22a of the outer branch 22.

The outer branch 22 includes an opposite second end 22b which is connected to a sealing lip 46 that is configured to come into abutment against at least one of the edges 12c, 28a to ensure sealing in this area, i.e., between the glass panel 12 and the vertical edge element 26. The outer branch 22 comprises or defines two grooves 48, 50. An outer groove 48 is formed in the outer face of the outer branch 22 and is configured to receive the protruding leg 44, and an inner groove 50 is formed in the inner face 22c of the outer branch 22 and is configured to receive the hook(s) 14a of the panel guide 14.

The groove 48 has a shape and dimensions similar to the ones of the leg 44. In the example shown, the leg 44 is configured to come into abutment at least against the bottom of the groove 48 and one of the lateral faces of this groove 48. The groove 50 has a shape and dimensions higher than that of the hook(s) 14a in the example shown.

In the position of FIG. 4, the portion 14ca of the panel guide 14 is in abutment against the outer branch 22, and in particular its inner face 22c, and the hook(s) 14a is/are slightly spaced from the outer branch 22, i.e., from the bottom and the lateral faces of the groove 50.

The outer branch 22, and in particular its inner face 22c, together with the bottom and the lateral faces of the groove 50 may be covered by an antifriction layer 52.

Both ends 20a, 24a of the branches 20, 24 may be joined together by a longitudinal portion 54 of the run seal 10, which is made of a material which is different from the material of at least a portion of each branches 20, 24. Advantageously, this portion 54 is configured to have a hinge function to allow modifying the angle α between the branches 20, 24.

The material of the portion 54 may have a Shore A hardness lower than that of the material of at least a portion of each branch 20, 24. For instance, the material of the portion 54 has a Shore A hardness of lower than 75 while the material of at least a portion of each branch 20, 24 has a Shore A hardness of higher than 75.

The inner branch 20 extends from the end 20a to an opposite end 20b and comprises an outer face 20c facing the panel guide 14 and the glass panel 12 and comprising at least one sealing lip 56 intended to cooperate with the inner face 12a of the glass panel 12 or the panel guide 14. The inner branch 20 comprises an inner face that faces 20d, the inner wall 30 and a portion of the frame 18, and in particular the inner metal plate 18a.

At least one protruding rib protrudes from the inner face 20d. In the example shown, the inner branch 20 may be considered as having two protruding ribs 58, 60.

The rib 58 is located at a distance D1 from the end 20a which is lower than a distance D2 between said rib 58 and the opposite end 20b. That means the rib 58 is closer to the end 20a than to the end 20b. The rib 60 is located at the opposite end 20b.

The rib 58 has a triangular or trapezoidal shape in cross section and comprises a first surface 58a located on a glass panel side and a second surface 58b located on an opposite side. The first surface 58a is substantially perpendicular to the inner branch 20 and is configured to cooperate by abutment with the surface 42b as shown, and the second surface 58b is inclined so as to form a ramp configured to cooperate with the end 30b and the ramp formed by the surface 42a.

The rib 60 has a rectangular shape in cross section and comprises a first surface 60a facing the surface 58a and an opposite second surface 60b. The first surface 60a is substantially perpendicular to the inner branch 20. The second surface 60b is covered by a material which can be similar to the material of the portion 54 and which is used to define an outer sealing lip 62 configured to cooperate with the inner face 12a of the glass panel 12, and an inner hook 64.

The hook 64 extends inwardly from the rib 60 and defines with this rib a slot 65 configured to receive both ends 18d as shown in FIG. 4. The rib 60 is configured to come into abutment with the outer face 18ba of the frame 18 and in particular of the outer metal plate 18b, and the hook 64 is configured to come into abutment with an inner face 18aa of the frame 18 and in particular of the inner metal plate 18a.

As it is the case for the sealing lips 46, 56 and 62, the hook 64 is shown in a rest position in FIG. 4. On the contrary, when the run seal 10 is mounted, the sealing lips and the hook 64 adopt a position where they are constrained.

The rib 60 has a thickness E3 higher than a thickness E4 of the rib 58. The thickness E4 of the rib 58 is equal to the size W of the gap 34 or is higher than the gap size W in the position shown in FIG. 4.

FIG. 4 shows a position of the run seal 10 which is called the final mounting position. In this specific position, the branches 20, 22 of the run seal 10, and in particular the faces 22c, 20c, define the gap 34 which is crossed by the panel guide 14. This gap 34 corresponds to the smaller space between the branches 20, 22 and its size W is measured in the plane P in FIG. 4.

This gap 34 has a size W which is similar to a thickness since it is measured along axis Y. As shown in FIG. 4, in the final mounting position, size W is advantageously higher than E1 but equal to E2 or lower than E2.

Figure 5:
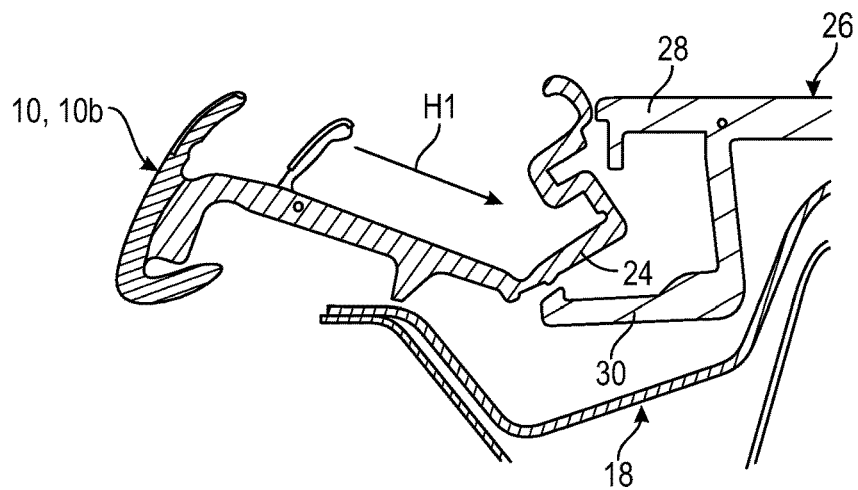
FIGS. 5 to 7 are schematic cross-section views of the of the motor vehicle side door of FIG. 4 and shows steps of a method according to the disclosure.
Figure 6:
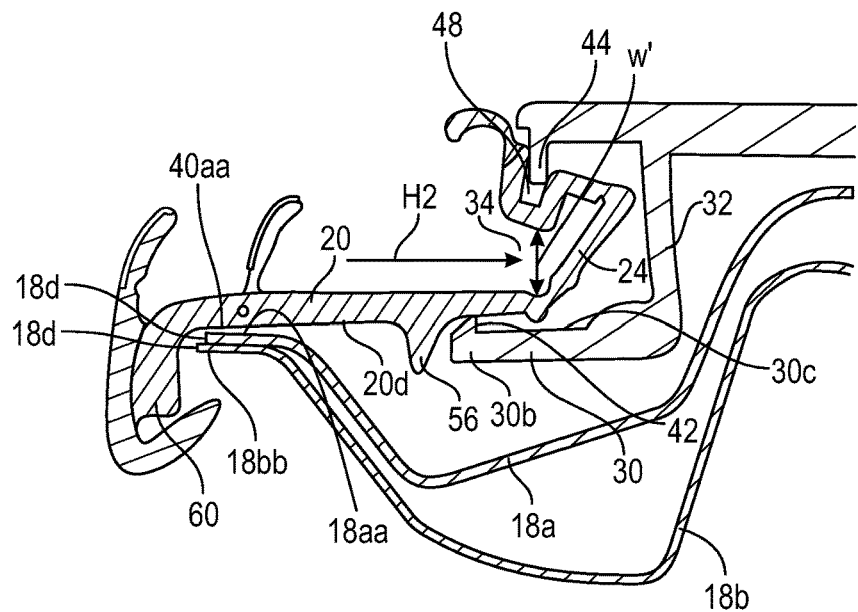
Figure 7:
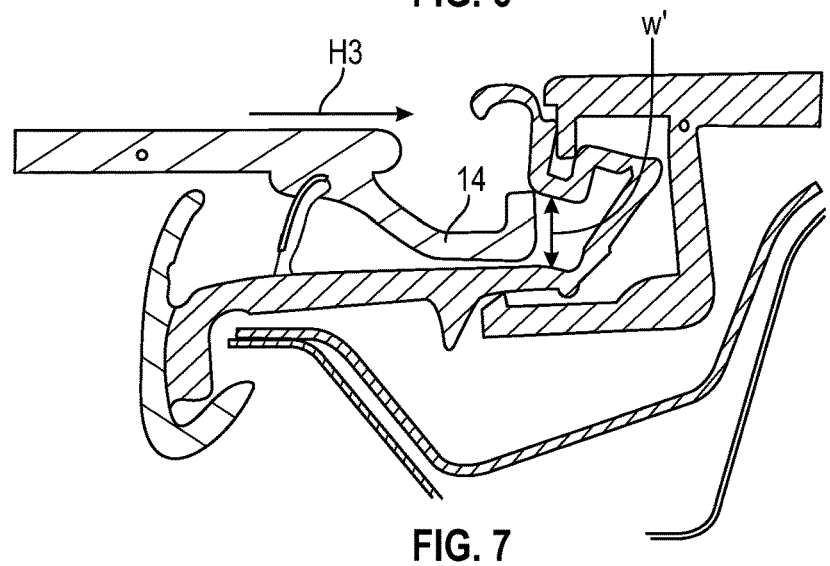

FIGS. 5 to 7 illustrates steps of a method for mounting a motor vehicle side door 16 according to embodiments of the disclosure.

The method comprises a first step a) shown in FIGS. 5 and 6 during which the run seal 10 is positioned so that its ascending strand 10b is in a preliminary mounting position relative to the inner wall 30 or the frame 18. In this position, the connecting branch 24 is engaged in the U-shaped portion of the element 26, i.e., between the walls 28, 30, until the ribs 58, 60 come in abutment against the free ends 30b, 18d as shown in FIG. 6.

Step a) is performed by displacing said ascending strand 10b in at least one direction H1, H2. The first direction H1 shown in FIG. 5 is inclined by an angle of 1 to 30° relative to the walls 28, 30. The second direction H2 shown in FIG. 6 is substantially parallel to the inner and outer walls 28, 30.

FIG. 6 shows that the protruding leg 44 enters into the groove 48 of the run seal 10 and that the inner face 20d of the inner branch 20 comes into abutment with the retaining rib 42 which tend to reduce the size of the gap 34.

Indeed, before step a), the ascending strand 10b has a rest position shown in FIG. 5 in which the angle α is higher than 90°. When the ascendant strand 10b is in the position of FIG. 6, this angle α is reduced which lead to a reduction of the size W' of the gap 34.

As shown in FIG. 7, The method includes a second step b) in which the panel guide 14 is engaged through the gap 34 and into the U-shaped so as to push the ascending strand 10b in the final mounting position of FIG. 4. In this position, the connecting branch 24 is moved towards the connecting wall 32 and the rib 58, 60 are forced to come into abutment against the outer faces 30c of the inner wall 30 and the outer face 18ba of the frame 18 and in particular of the outer metal plate 18b.

Then, the rib 58 slides onto the rib 42 up to the position of FIG. 4 where both faces 42b, 58a face each other as shown in FIG. 4 and cooperate therebetween to ensure immobilization of the run seal 10.

Step b) is performed by displacing the glass panel 14 in a direction which is substantially parallel to the walls 28, 30.

When the ascendant strand 10b is in the position of FIG. 4, the angle α is reduced to a value lower than 90° and the gap 34 has a size W as specified above.

Figure 8:
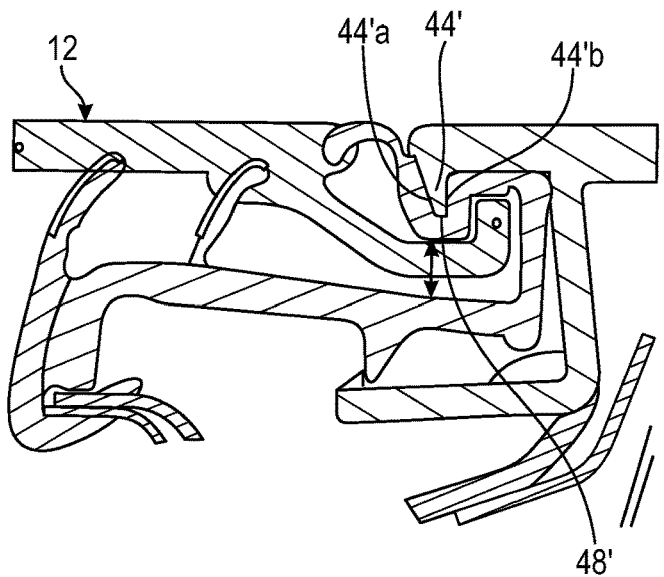
FIGS. 8 to 10 are schematic cross-section views similar to the view of FIG. 4 and showing other embodiments of the disclosure.
Figure 9:
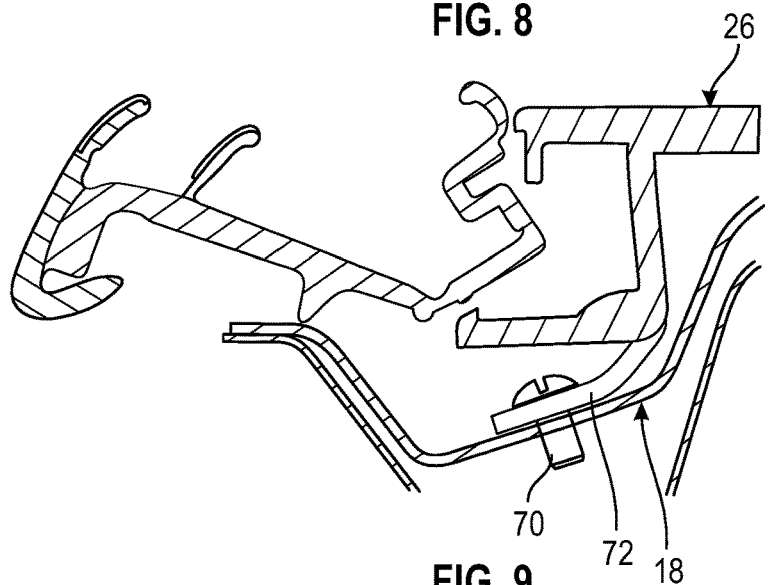
Figure 10:
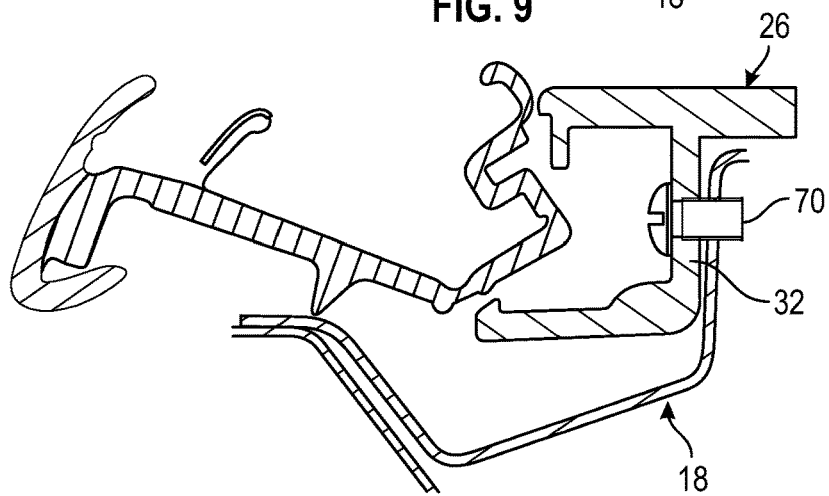

FIGS. 8 to 10 show some other embodiments according to the disclosure. FIG. 8 differs from the embodiment of FIGS. 4 to 7 according to which the protruding leg 44' and the groove 48' receiving this leg have a different shape in cross section which is triangular or trapezoidal. This leg 44' comprises a first lateral face 44a' on the glass panel side 12 and a second lateral face 44b' on the opposite side. The face 44a' is inclined while the face 44b' is perpendicular to the glass panel 12.

FIGS. 9 and 10 differ from the embodiment of FIGS. 4 to 7 according to which the vertical edge element 26 is secured by screwing to the frame 18. One or more screw 70 passes through an orifice of the U-shape portion and is screwed into a threaded orifice of the frame 18 or a nut carried by the frame. In the example shown in FIG. 9, the orifice of the U-shaped portion is formed into a leg 72 and in the example shown in FIG. 10, the orifice is formed into the connecting wall 32.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A motor vehicle side door, comprising:
   a glass panel having an outer face and an inner face and carrying a panel guide secured onto said inner face, said glass panel being able to be moved from an upright position to a downright position,
   a frame that is configured to extend along edges of the glass panel when the glass panel is in said upright position, the frame including a vertical edge element which is adjacent to the glass panel when it is in said upright position and which has an outer surface laterally flush with said outer face of the glass panel, said vertical edge element comprising a U-shaped portion in cross section including an outer wall which is substantially parallel to said glass panel and which includes said outer surface, an inner wall which is substantially parallel to said glass panel, and a connecting wall connecting said outer wall to said inner wall, and an elastomer run seal mounted on the frame and suitable for receiving said glass panel when moving, the run seal comprising at least one ascending strand configured to be mounted at least in part in said U-shaped portion, said at least one ascending strand having an outer branch configured to be in contact with said outer wall and to be sealably in contact with said glass panel, an inner branch able to be in contact with said inner wall, and a connecting branch connecting said outer branch to said inner branch, an outer face of said inner branch and an inner face of said outer branch defining therebetween a gap which extends in a first plane substantially perpendicular to said glass panel and which is configured to be crossed by said panel guide, said outer branch comprising a groove that is able to receive at least one hook of said panel guide, said inner branch comprising an inner face comprising at least one protruding rib which protrudes inwardly and which is able to be in contact with an outer face of said inner wall or against an outer face of the frame, wherein said inner wall includes a retaining rib extending towards said glass panel and configured to come into abutment with said at least one protruding rib so as to retain said run seal in said final mounting position, said inner wall comprising a first end connected to said connecting wall and an opposite free second end, said retaining rib being located on said opposite free second end, and wherein said at least one protruding rib is located and dimensioned so as to be able to come into abutment against said opposite free second end of said inner wall when said at least one ascending strand is in a preliminary mounting position on the frame in which said at least one hook is being introduced in said groove, and to be able to come into abutment against said outer face and with said retaining rib of said inner wall when said at least one ascending strand is in a final mounting position on the frame in which said at least one hook is located in said groove, moving of said at least one ascending strand from the preliminary mounting position to the final mounting position being realized in a direction substantially perpendicular to said first plane, and said gap having a gap size measured in said first plane which is greater when the run seal is in the preliminary mounting position than when it is in the final mounting position.

2. The motor vehicle side door according to claim 1, wherein said inner branch has a first end connected to said connecting wall and an opposite second end, and wherein said at least one protruding rib is located at a distance from said first end which is lower than a distance between said protruding rib and said opposite second end.

3. The motor vehicle side door according to claim 2, wherein a first protruding rib of said at least one protruding rib is located at said opposite second end and a second protruding rib of said at least one protruding rib is located at a distance from said opposite second end and at a distance from said first end.

4. The motor vehicle side door according to claim 3, wherein said first protruding rib has a thickness greater than a thickness of said second protruding rib, said thicknesses being measured in directions perpendicular to said glass panel.

5. The motor vehicle side door according to claim 1, wherein said at least one protruding rib has a thickness which is equal to said gap size or which is greater than said gap size, when the run seal is in the final mounting position, said thickness being measured in a direction perpendicular to said glass panel.

6. The motor vehicle side door according to claim 1, wherein said at least one protruding rib comprises a first surface located on a glass panel side and a second surface located on an opposite side, said first surface being substantially perpendicular to said inner branch and said second surface being inclined so as to form a ramp configured to cooperate by sliding with said free end of said inner wall or of said frame.

7. The motor vehicle side door according to claim 1, wherein said inner wall has a length measured between both first and opposite second ends which is greater than a length of said outer wall.

8. The motor vehicle side door according to claim 1, wherein said outer wall includes a protruding leg which protrudes from said inner face of said outer wall towards said outer face of said inner wall and which is configured to be engaged into a groove of said outer branch.

9. The motor vehicle side door according to claim 8, wherein said outer wall comprises a first end or portion connected to said connecting wall and an opposite second end, said protruding leg being located on or close to said opposite second end.

10. The motor vehicle side door according to claim 1, wherein said panel guide comprises a first edge secured onto said inner face of said glass panel and an opposite second edge which is L-shaped and which includes a first portion parallel to said glass panel and having a thickness lower than said gap size when said run seal is in both preliminary and final mounting positions, and a second portion perpendicular to said glass panel and forming said at least one hook, said hook having a thickness greater than said gap size when said run seal is in said final mounting position, said thicknesses being measured in directions perpendicular to said glass panel.

11. A method for mounting the motor vehicle door according to claim 1, comprising:
  a) positioning the run seal so that its ascending strand is in said preliminary mounting position relative to said inner wall or said frame, wherein said connecting branch is engaged in said U-shaped portion and said at least one protruding rib is in abutment against said free end of said inner wall or of said frame, and
  b) engaging said panel guide through said gap and into said U-shaped portion so as to push said ascending strand in said final mounting position, wherein said connecting branch is moved towards said connecting wall and said at least one protruding rib is forced to come into abutment against said outer face of said inner wall or of said frame.

12. The method according to claim 11, wherein step a) is performed by displacing said ascending strand in at least one direction which is substantially parallel to said inner and outer walls or which is inclined by an angle of 1 to 30° relative to said inner and outer walls.

13. The method according to claim 11, wherein step b) is performed by displacing said glass panel in a direction which is substantially parallel to said inner and outer walls.

14. The method according to claim 11, wherein, before step a), said ascending strand has a rest position in which said inner and connecting branches are inclined one another by an angle greater than 90°, and wherein, after step b), said ascending strand has a constrained position in which said inner and connecting branches are inclined one another by an angle lower than 90°.

15. A motor vehicle side door, comprising:
- a glass panel having an outer face and an inner face and carrying a panel guide secured onto said inner face, said glass panel being able to be moved from an upright position to a downright position,
- a frame that is configured to extend along edges of the glass panel when the glass panel is in said upright position, the frame including a vertical edge element which is adjacent to the glass panel when it is in said upright position and which has an outer surface laterally flush with said outer face of the glass panel, said vertical edge element comprising a U-shaped portion in cross section including an outer wall which is substantially parallel to said glass panel and which includes said outer surface, an inner wall which is substantially parallel to said glass panel, and a connecting wall connecting said outer wall to said inner wall, and
- an elastomer run seal mounted on the frame and suitable for receiving said glass panel when moving, the run seal comprising at least one ascending strand configured to be mounted at least in part in said U-shaped portion, said at least one ascending strand having an outer branch configured to be in contact with said outer wall and to be sealably in contact with said glass panel, an inner branch able to be in contact with said inner wall, and a connecting branch connecting said outer branch to said inner branch, an outer face of said inner branch and an inner face of said outer branch defining therebetween a gap which extends in a first plane substantially perpendicular to said glass panel and which is configured to be crossed by said panel guide, said outer branch comprising a groove that is able to receive at least one hook of said panel guide, said inner branch comprising an inner face comprising at least one protruding rib which is able to be in contact with an outer face of said inner wall or against an outer face of the frame,
- wherein said at least one protruding rib is located and dimensioned so as to be able to come into abutment against a free end of said inner wall or of said frame when said at least one ascending strand is in a preliminary mounting position on the frame, and to be able to come into abutment against said outer face of said inner wall or against said outer face of said frame when said at least one ascending strand is in a final mounting position on the frame, moving of said at least one ascending strand from the preliminary mounting position to the final mounting position being realized in a direction substantially perpendicular to said first plane, and said gap having a gap size measured in said first plane which is greater when the run seal is in the preliminary mounting position than when it is in the final mounting position,
- wherein said inner wall includes a retaining rib extending towards said glass panel and configured to come into abutment with said at least one protruding rib so as to retain said run seal in said final mounting position,
- and wherein said inner wall comprises a first end connected to said connecting wall and an opposite second end, said retaining rib being located on said opposite second end, said inner wall having a length measured between both first and opposite second ends which is greater than a length of said outer wall.

\* \* \* \* \*